Oct. 19, 1926.
S. B. MOLONY
BRUSH
Filed May 16, 1923
1,603,626
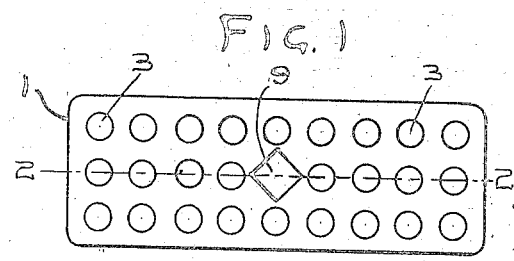
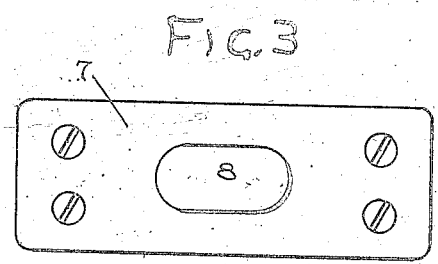
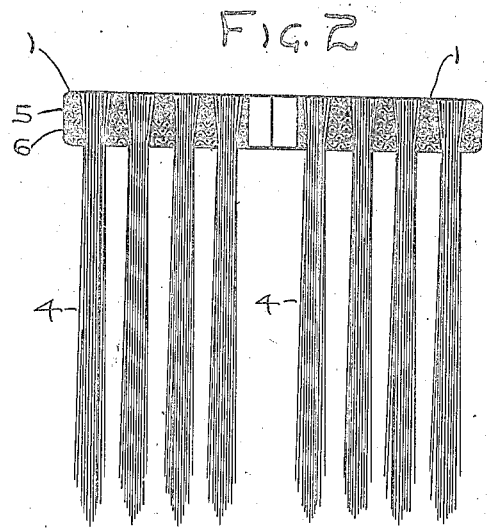
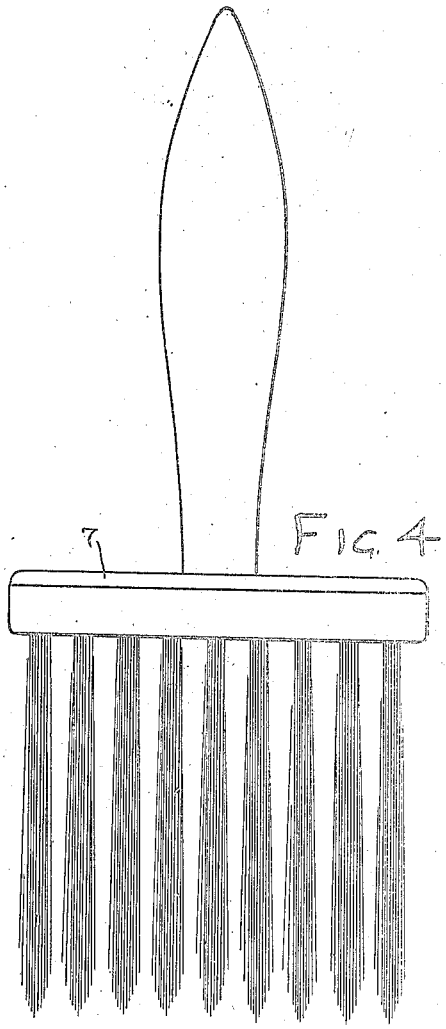
INVENTOR.

Patented Oct. 19, 1926.

1,603,626

UNITED STATES PATENT OFFICE.

STUART B. MOLONY, OF CONSHOHOCKEN, PENNSYLVANIA.

BRUSH.

Application filed May 16, 1923. Serial No. 639,236.

The invention is illustrated in the accompanying drawing, in which—

Fig. 1 is a plan view of the brush back;

Fig. 2 is a cross-sectional view upon line 2—2 of Fig. 1;

Fig. 3 is a plan view of the completed brush; and

Fig. 4 is a side elevation.

This invention relates to an improvement in the construction of the block for holding the bristles shown in cross section in 1, Fig. 2, and consists in an improved construction of the block for the purpose of increasing its strength.

This type of brush in which the bristles are set in small clusters, or "sets", in small holes in the block, is commonly used for calcimine or water paints, and the block must not only be waterproof so it will not swell and warp, but it must be strong enough to resist the swelling action of the water on the bristles. But I do not wish to limit myself to such calcimine brushes as my improvement is suited for use for floor waxing brushes, painters' dust brushes, etc., where a strong block is required to resist mechanical shocks.

The blocks for calcimine brushes are commonly made of hard rubber, but while most of the brushes made with hard rubber blocks are satisfactory it cannot be depended upon to stand severe mechanical shocks, especially in cold weather when hard rubber is quite brittle. In order to overcome this brittleness I have added fibres, such as cotton fire, to the hard rubber compound, and have found that the addition of twenty percent of cotton fibre, by weight, to the pure hard rubber compound consisting of hard rubber and sulphur, greatly increases the resistance of the block to shocks. This is because the cotton fibre, which is from five to ten times as strong as the hard rubber itself, binds the rubber together and decreases the tendency to cleavage.

In order to better take advantage of the strength of fibre I made up blocks of alternate layers of canvas and hard rubber by calendering the hard rubber compound into the single plies of canvas, stacking sufficient sheets together to make a block of the required thickness, and vulcanizing until hard under a press. The proportions by weight of hard rubber to canvas were approximately 60 to 40. This made a very tough block which could be bored and machined like a block of wood. I also built up blocks of alternate layers of hard rubber and copper screening and found that this made an excellent block and could be bored.

When paper is used in alternate layers with hard rubber it is necessary to first impregnate the paper with hard rubber compound. This can best be done by dissolving the compound in a rubber solvent, such as solvent naptha, passing the paper through the solution slowly enough to allow it to penetrate properly, drying out the solvent, and finally stacking the sheets together in sufficient number to form the slabs of the required thickness and vulcanizing under a press.

The mechanical properties of hard rubber, however, are very sensitive to temperature changes, and rubber which is hard enough in warm water is too brittle at winter temperature to have the proper strength. I find that blocks built up of alternate layers of canvas or paper bound together with the synthetic resin resulting from the condensation of phenol and formaldehyde form a block less senstive to temperature changes than those in which hard rubber is used as in binding material. In forming these the blocks are made by impregnating the single sheets of canvas with the synthetic resin in syrup form, drying the impregnated sheets in a vacuum dryer at a temperature too low to cause polymerization of the resin, stacking the sheets together under a hydraulic press, preferably in a vacuum dryer, and pressing between heated platens at a sufficient temperature and for a sufficient length of time to cause thorough polymerization and hardening of the resin. About 220 degrees F. for a period of six hours appears sufficient for this.

While these and the canvas-hard-rubber blocks may be described as alternate layers of canvas, or paper, and binding material, this may not be an exact description as in both cases the binding material is impregnated into the fabric or fibre and the binding material can not be said to remain in layers.

In attempting to produce blocks consisting of alternate layers of metal sheets and phenol-formaldehyde condensation products I find that the large difference between the temperature coefficients of the metal and the resin prevents a good union. 1 find, however, that a good union can be made by first plating the metal sheets with copper, next dipping them into a solution of hard rubber compound dissolved in solvent naptha, evaporating the naptha, and then applying the synthetic resin, and then stacking the metal sheets together and vulcanizing and polymerizing the whole mass with heat. The film of hard rubber which will form a strong union with a coppered metallic surface also forms a strong union with the synthetic resin after polymerization, and it not only binds the metal and the synthetic resin together, but it also has the same effect as a breaker strip in an automobile tire and takes up the strain caused by the difference in the expansions of the metal and resin. Where wire screening is used instead of plates this is not so necessary as the wire is imbedded in the resin and cannot break away so easily.

In Fig. 1 is shown in plan view the block holding the bristles. It is bored with a large number of taper holes, 3, to receive the clumps of bristles, 4, Fig. 2. These are cemented together in a solid clump, or "set" with various setting materials such as shellac, rubber, synthetic resin, etc. They can either be set in the holes while the setting material is plastic and then the setting material can be hardened in place, or the clumps can be previously cemented together and hardened in the proper sized clump with the proper taper to fit the holes and then introduced into the holes after the cementing material is hard. When this is done the clumps, if desired, can be cemented in the holes with a cement different from that used to bind the bristles together, and one which does not require such a high temperature to harden as hard rubber requires. In this way it is possible to use a hard rubber setting for binding together the bristles in clumps and yet use a block made up with a binding material which will not stand the heat of vulcanization necessary for hard rubber.

Figure 2 is a cross section in elevation through the plane 2—2, Fig. 1, showing the laminated structure of alternate layers of binding material, 5, and strengthening material, 6, of which this invention consists.

Figure 3 is the plan view of the completed brush showing the cap, 7, which is fastened down over the tapered holes after the bristles are in place to hold them in, and the handle, 8, which is held in the square hole, 9, Fig. 1.

Fig. 4 is the elevation of the completed brush.

In making these blocks it is customary to make up the solid block and bore the holes after the block has been hardened to a solid mass. It is possible, however, to punch the holes in the separate sheets of paper, or fabric, before the sheets are stacked together, and, of course, before the hardening of the binding materials. If this is done, and the separate perforated sheets are stacked over a mould consisting of conical metal plugs, it is possibl to form the block with moulded holes and so save the cost of boring.

I claim:

1. In a brush, a brush head comprising a solid laminated block which is made of a plurality of layers of fibrous material impregnated and bound together by a hardened plastic material, tuft sockets formed in said block, and bristle tufts mounted in said sockets.

2. In a brush, a brush head comprising a solid laminated block which is made of a plurality of layers of fibrous material impregnated and bound together by a hardened synthetic resin, tuft sockets formed in said block extending through a plurality of laminations, and bristle tufts mounted in said sockets.

3. In a brush, a brush head comprising a solid laminated block which is made of a plurality of layers of woven material impregnated and bound together by an aldehydephenolic resin, tuft sockets formed in said block extending through a plurality of laminations, bristle tufts mounted in said sockets, and a handle fitted into a hole in said block.

4. In a brush, a brush head comprising a solid laminated block which is made of a plurality of layers of woven fabric impregnated and bound together by a hardened plastic material, tuft sockets formed in said block, and bristle tufts mounted in said sockets.

STUART B. MOLONY.